Dec. 14, 1937.　　　　G. H. SHAPTER　　　　2,102,387
ELECTRIC POWER SYSTEM
Filed April 16, 1937　　　2 Sheets-Sheet 1

Inventor:
George H. Shapter,
by Harry E. Dunham
His Attorney.

Dec. 14, 1937.　　　　G. H. SHAPTER　　　　2,102,387
ELECTRIC POWER SYSTEM
Filed April 16, 1937　　　　2 Sheets-Sheet 2
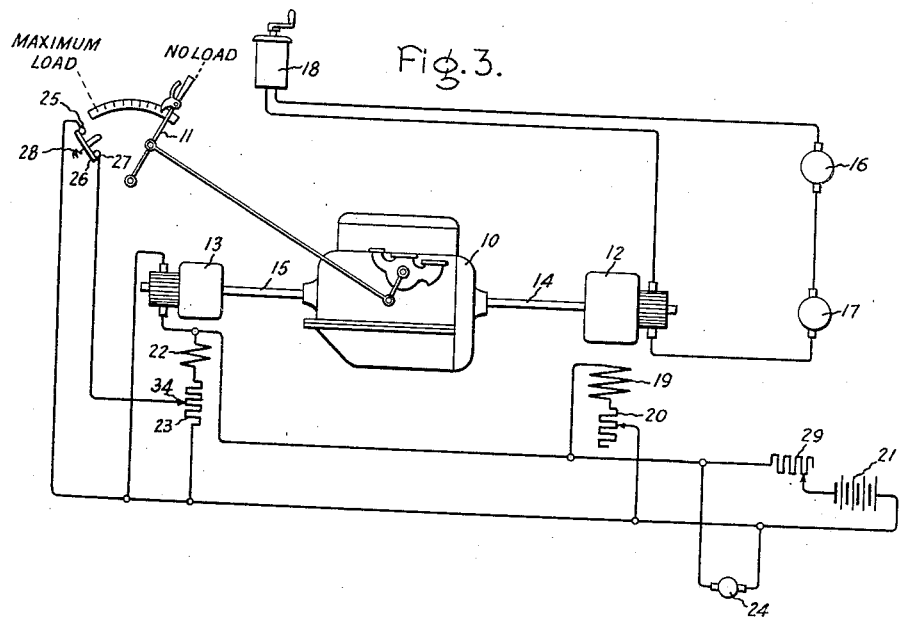
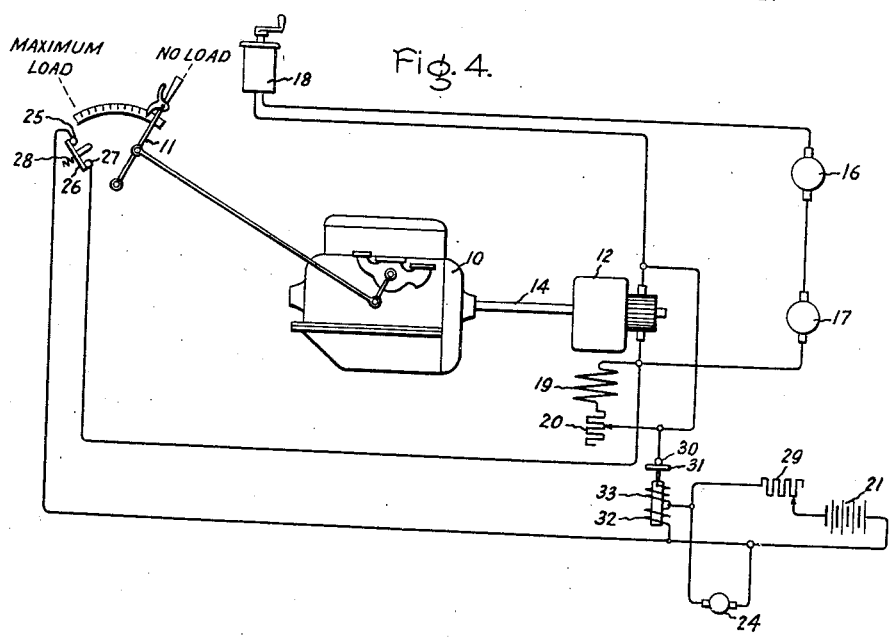
Inventor:
George H. Shapter,
by Harry E Dunham
His Attorney.

Patented Dec. 14, 1937

2,102,387

UNITED STATES PATENT OFFICE 2,102,387

ELECTRIC POWER SYSTEM

George H. Shapter, Erie, Pa., assignor to General Electric Company, a corporation of New York Application April 16, 1937, Serial No. 137,253

8 Claims. (Cl. 290—17)

My invention relates to power systems adapted for use in self-propelled vehicles wherein an engine drives a generator arranged to supply power to electric motors for driving the vehicles.

On a vehicle of this type, there are often auxiliaries such as radiator blower motors, air compressor motors for the braking system, and blower motors for the traction motors, all of which require power and generally decrease the power available for driving the traction motors by about 10% of the prime mover output. In many instances, this is an undesirable feature, as the maximum power of the engine is not available for driving the traction motors under heavy load conditions.

An object of my invention is to provide a power system of this character wherein the maximum power developed by the prime mover will be available for operating the driving motors under maximum load conditions.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 1:
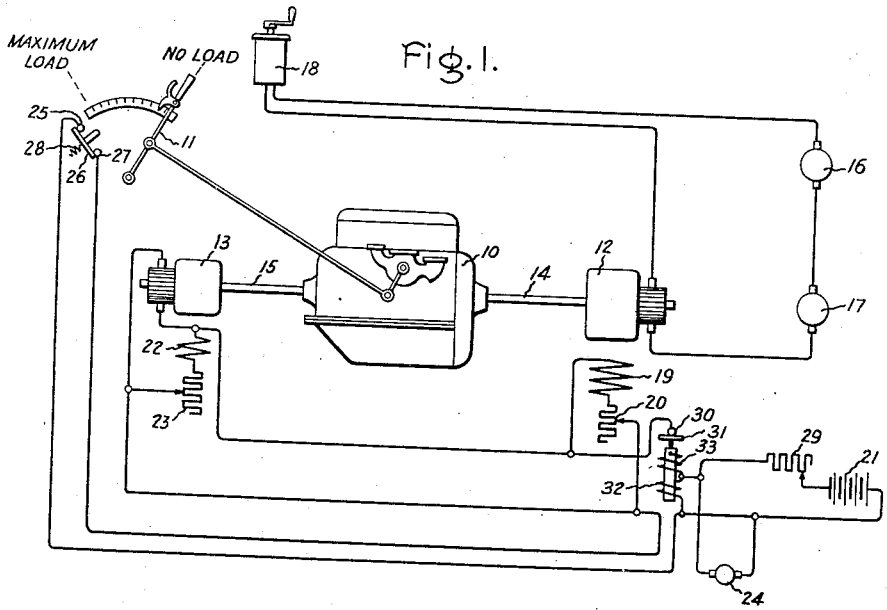
Figure 2:
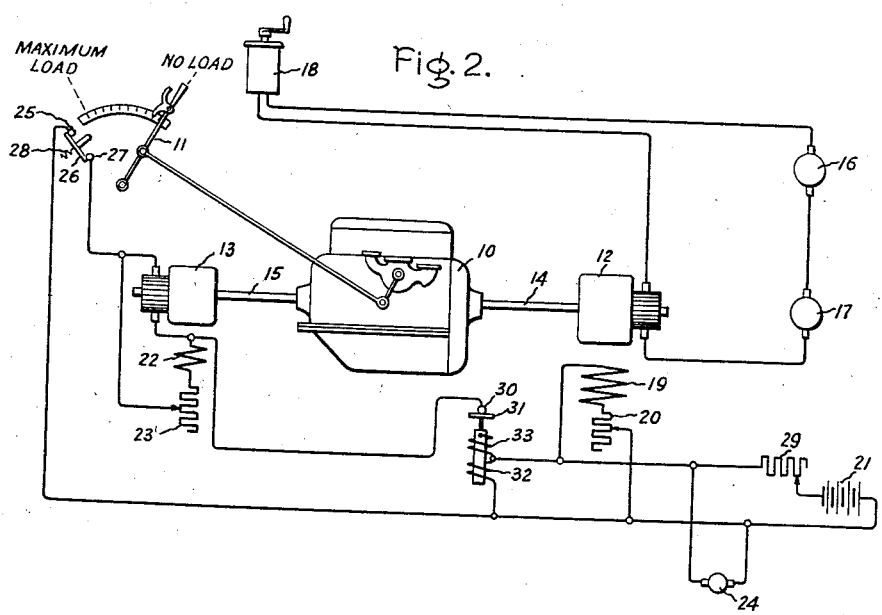

In the drawings, Fig. 1 is a schematic diagram representing the driving and auxiliary equipment of a self-propelled vehicle embodying my invention and shows the electrical connections thereof; Figs. 2, 3, and 4 diagrammatically illustrate modifications of the power system shown in Fig. 1 embodying my invention.

Referring to the drawings, the self-propelled vehicle shown in Fig. 1 includes a prime mover 10, which may be an internal combustion engine, or other suitable power source, controlled by a throttle lever 11 and coupled to a main generator 12 and an auxiliary generator 13 by shafts 14 and 15, respectively. The main generator 12 is connected to the main load, comprising traction motors 16 and 17, through a controller 18 for these motors. The excitation of the main generator 12 is provided by a field exciting winding 19 connected through a variable resistor 20 across the auxiliary generator 13 and the battery 21. The auxiliary generator 13 is excited by a field exciting winding 22 connected through a variable resistor 23 across the terminals of the auxiliary generator 13. A blower motor 24 is connected across the battery 21 and through contact 25, contactor 26, and contact 27, across the auxiliary generator 13. The contactor 26 is spring biased by a spring 28 into engagement with the contacts 25 and 27, so as to close the circuit between these contacts under all operating conditions except when there is a maximum power demand upon the engine 10, in which case, the throttle lever 11, which controls the power developed by the prime mover, will be moved to its maximum load position, and will engage the contactor 26 and depress it to its open position. Thus, under maximum load conditions, the circuit is opened between the auxiliary generator 13, and the auxiliary load 24 and the battery 21, so that the only remaining load upon the auxiliary generator is the current required to energize the field exciting windings 19 and 22, and the auxiliary blower motor 24 is supplied with power from the battery 21. In this manner, the auxiliary load is removed from the engine 10 and the main generator in response to or dependent upon the operating condition of the system. A variable resistor 29 is connected in series with the battery 21 so that it may be charged by the desired charging current when the engine 10 is not developing maximum power, and a reverse-current relay having normally closed contacts 30 and 31, prevents discharge of the battery 21 through the auxiliary generator 13 if the generator voltage drops below the battery voltage. A voltage coil 32 is connected across the auxiliary generator 13 and normally holds the relay contacts 30 and 31 closed, however, if the battery starts to discharge through the auxiliary generator, the current reverses through a current coil 33 and opposes the effect of the voltage coil 32, causing the relay to open and disconnect the generator from the battery. In this manner, under maximum load conditions on the traction motors, the maximum power developed by the prime mover 10 is available for driving the vehicle and the auxiliary load is supplied by the battery 21. Under all other operating conditions, the main and auxiliary loads are both supplied by power developed by the prime mover, and the battery 21 may also be charged.

The arrangements shown in Figs. 2, 3 and 4 are similar to that shown in Fig. 1, and the same reference characters have been used to designate similar parts in all of these views.

In the arrangement shown in Fig. 2, the main generator field exciting winding 19 and the auxiliary load 24 are both connected across the battery 21, and through the contact 25, the contactor 26, and the contact 27, across the auxiliary generator 13. In this arrangement, during maximum load conditions, all of the load on the auxiliary generator 13, except that required for energizing its own field exciting winding 22, is removed by the opening of the contactor 26. It is desirable that the field exciting winding 22 of the auxiliary generator 13 remain energized, so that the voltage of the auxiliary generator will be maintained, and it will be able to supply power to the auxiliary load when the throttle lever 11 is moved to some position other than the maximum load position. The remainder of this system and its operation is substantially the same as that of Fig. 1.

In the arrangement shown in Fig. 3, the main generator field exciting winding 19 and the variable resistor 20, the auxiliary generator field exciting winding 22 and the variable resistor 23, the battery 21 and the variable resistor 29, and the blower motor 24, all are connected in parallel. Under all operating conditions except maximum load, the auxiliary generator 13 is arranged to energize its field exciting winding 22, the main generator field exciting winding 19, supply power to the blower motor 24, and under predetermined conditions charge the battery 21. In this system, a contactor 34 is arranged to short-circuit a certain amount of the resistance of the variable resistor 23 in circuit with the auxiliary generator field exciting winding 22 through contact 27, contactor 26, and contact 25 under all operating conditions except during maximum load on the engine 10. During maximum load demand, the throttle control lever 11 is arranged to open the circuit between the contact 25, the contactor 26, and the contact 27, so that all of the resistance of the resistor 23 is inserted in series with the auxiliary generator field exciting winding 22. This reduces the excitation of the auxiliary generator 13, and consequently, reduces the voltage generated in the armature of the auxiliary generator. Since the battery 21 is connected across the terminals of the generator 13, this reduction in the generated voltage results in a reversal of current flow through the armature of the generator, so that it operates as a motor and assists the engine 10 in driving the main generator 12. Under these conditions the energization of the field exciting windings 19 and 22 and the power required by the blower motor 24 are also supplied by the battery 21. Thus, under maximum power conditions, the maximum power of the engine 10 is available for driving the traction motors 16 and 17 and this is augmented to a certain extent by the additional power delivered to the generator 12 by the auxiliary generator 13 operating as a motor.

Fig. 4 illustrates a simplified embodiment of my invention wherein the main generator 12 is self-excited by the field exciting winding 19 which is connected through the variable resistor 20 across the terminals of the generator 12. As in the other figures, the main load comprises traction motors 16 and 17 connected across the generator 12 through the controller 18, and the power developed by the engine 10 is controlled by the throttle lever 11. In this arrangement, no auxiliary generator is utilized, and the blower motor 24 and the battery 21 are both connected through contact 25, contactor 26, and contact 27 across the terminals of the generator 12. Under all operating conditions except maximum load on the engine, the blower motor 24 is supplied with power by the generator 12, and the battery 21 is charged under predetermined conditions depending upon the setting of the variable resistor 29 and the state of charge of the battery. Under maximum load conditions, the throttle lever 11 opens the circuit between the contact 25, contactor 26, and the contact 27, thereby opening the circuit between the generator 12 and the blower motor 24 and the battery 21. Under this condition, all of the power developed by the engine 10 is available for driving the traction motors 16 and 17, and the blower motor 24 is supplied with power from the battery 21. Thus, it is seen that the power developed by the prime mover is available for supplying the main and auxiliary loads, and that under maximum load conditions, the auxiliary load is removed from the prime mover and is supplied by another source of power supply, thereby making the entire power developed by the prime mover available for driving the traction motors.

While I have illustrated and described several embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A power system including a prime mover providing a source of power supply, a source of electrical power supply, a main electrical load, an auxiliary electrical load, means for supplying power to said electrical loads from said prime mover, means responsive to a predetermined operating condition of said system for removing said auxiliary load from said prime mover, and means for connecting said auxiliary load across said source of electrical power supply.

2. A power system including a prime mover providing a source of power supply, a source of electrical power supply, a main electrical load, an auxiliary electrical load, means for supplying power to said electrical loads from said prime mover, means dependent upon a heavy load operating condition of said systems for removing said auxiliary load from said prime mover, and means for connecting said auxiliary load across said source of electrical power supply.

3. A power system including a prime mover providing a source of power supply, a source of electrical power supply, a main electrical load, an auxiliary electrical load, means for supplying power to said electrical loads from said prime mover, means for controlling the power developed by said prime mover, means responsive to a predetermined operating position of said prime mover power controlling means for removing said auxiliary electrical load from said prime mover source of power supply, and means for connecting said auxiliary load across said source of electrical power supply.

4. A power system including a prime mover, a main generator driven by said prime mover, an electrical load connected to said main generator, an auxiliary generator driven by said prime mover, a source of electrical power supply, an auxiliary electrical load, means for connecting said auxiliary load and said source of electrical power supply across said auxiliary generator, means for controlling the power developed by said prime mover, and means dependent upon said prime mover power controlling means for removing said auxiliary load from said auxiliary generator.

5. A power system including a prime mover, a main generator driven by said prime mover, a field exciting winding for said main generator, an electrical load connected to said main generator, an auxiliary generator driven by said prime mover, means for energizing said main generator field exciting winding in accordance with an electrical characteristic of said auxiliary generator, a source of electrical power supply, an auxiliary electrical load, means for connecting said auxiliary electrical load and said source of electrical power supply across said auxiliary generator, means for controlling the power developed by said prime mover, and means dependent upon said prime mover power controlling means for removing said auxiliary load from said auxiliary generator.

6. A power system including a prime mover, a main generator driven by said prime mover, an electrical load connected to said main generator, an auxiliary generator driven by said prime mover, a source of electrical power supply, an auxiliary electrical load, means for connecting said auxiliary electrical load across said auxiliary generator and said source of electrical power supply, means for controlling the power developed by said prime mover, and means dependent upon said prime mover power controlling means for disconnecting said auxiliary load from said auxiliary generator.

7. A power system including a prime mover, a main generator driven by said prime mover, a field exciting winding for said main generator, an electrical load connected to said main generator, an auxiliary generator driven by said prime mover, a field exciting winding for said auxiliary generator energized in response to an electrical characteristic thereof, a source of electrical power supply, an auxiliary electrical load, means for connecting said auxiliary electrical load and said main generator field exciting winding across said auxiliary generator and said source of electrical power supply, means for controlling the power developed by said prime mover, and means dependent upon said prime mover power controlling means for removing said auxiliary load and the main generator field exciting winding energization from said auxiliary generator.

8. A power system including a prime mover, a main generator driven by said prime mover, a field exciting winding for said main generator, an electrical load connected to said main generator, an auxiliary generator driven by said prime mover, a field exciting winding for said auxiliary generator energized in response to an electrical characteristic thereof, a source of electrical power supply, an auxiliary electrical load, means for connecting said auxiliary electrical load and said main generator field exciting winding across said auxiliary generator and said source of electrical power supply, means for controlling the power developed by said prime mover, and means dependent upon said prime mover controlling means for removing said auxiliary load and the main generator field exciting winding energization from said auxiliary generator and for supplying power to said auxiliary generator from said source of electrical power supply.

GEORGE H. SHAPTER.